(12) United States Patent
Blanksby et al.

(10) Patent No.: US 6,677,995 B1
(45) Date of Patent: Jan. 13, 2004

(54) ARRAY READOUT SYSTEM

(75) Inventors: Andrew John Blanksby, Neptune, NJ (US); Marc J. Loinaz, New York, NY (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/244,363

(22) Filed: Feb. 4, 1999

(51) Int. Cl.[7] .......................... H04N 3/14; H04N 5/335; H04N 5/217
(52) U.S. Cl. .................. 348/301; 348/308; 348/241; 348/294
(58) Field of Search ................ 348/241, 302, 348/308, 301, 310, 294, 300; 250/208.1

(56) References Cited

U.S. PATENT DOCUMENTS

| | | | | |
|---|---|---|---|---|
| 5,081,536 A | * | 1/1992 | Tandon et al. .............. | 348/241 |
| 5,892,540 A | * | 4/1999 | Kozlowski et al. ......... | 348/241 |
| 5,917,547 A | * | 6/1999 | Merrill et al. .............. | 348/308 |
| 5,923,369 A | * | 7/1999 | Merrill et al. .............. | 348/301 |
| 6,438,276 B1 | * | 8/2002 | Dhuse et al. ............... | 348/241 |
| 6,469,740 B1 | * | 10/2002 | Kuroda et al. .............. | 348/308 |

FOREIGN PATENT DOCUMENTS

| WO | WO 9948282 | 9/1999 | ........... H04N/3/15 |
|---|---|---|---|

OTHER PUBLICATIONS

European Search Report dated Oct. 3, 2000 for Application No. EP 00 30 0583.

* cited by examiner

Primary Examiner—Wendy R. Garber
Assistant Examiner—Lin Ye
(74) Attorney, Agent, or Firm—Eugene J. Rosenthal

(57) ABSTRACT

Problems with source followers employed in active arrays are alleviated by employing a differential amplifier for each element of the active array. However, instead of including an entire differential amplifier within each element, part of the differential amplifier structure is shared among each sensor element connected to a particular column. For example, the differential amplifier may be a differential pair operational transconductance amplifier (OTA) which is connected using a feedback configuration. However, instead of including an OTA within each sensor element of the array, part of the OTA structure is shared among each sensor element connected to a particular column. Although gains greater than one are achievable by employing the differential amplifier with a feedback network, to avoid introducing fixed pattern noise, substantially unity gain is often preferred. Furthermore, the shared differential amplifier model of array reading may be employed for any active array readout application, e.g., including arrays that are not in themselves per se sensor arrays, where the necessary structure to form the shared differential amplifier is included within the elements of the array.

28 Claims, 1 Drawing Sheet

ARRAY READOUT SYSTEM

TECHNICAL FIELD

This invention relates to the art of reading arrays of values, such as the values of pixels in a solid state image sensor.

BACKGROUND OF THE INVENTION

When reading values from arrays, such as an array of pixels in a solid state image sensor or other sensor, often the elements of a column of the array are multiplexed onto a single line, and these column lines may then be further multiplexed onto a single serial readout line, such as one which is connected to an analog-to-digital (A/D) converter. The multiplexing is often achieved by using switching transistors which are addressable to control access to the column and/or readout line.

Because the feature size of silicon devices has become so small, it is possible today to include within each sensor array element some active circuitry, e.g., an amplifier or buffer, and arrays with such included active circuitry are known in the art as active arrays. Using such active circuitry is advantageous, because the signal from the sensor can be conveyed to the output line with low noise and with far less attenuation than with prior so-called passive arrays, which did not include active circuitry in the array elements. Often, the circuitry in each array element is arranged as a source follower which employs a current source that is located outside of the array element and is shared by all array elements in a column.

SUMMARY OF THE INVENTION

We have recognized that source followers implemented in complementary metal oxide semiconductor (CMOS), which is the currently preferred technology for sensor arrays due to cost considerations, suffer from a voltage gain of significantly less than one as a result of the so-called "body effect", an effect which causes the threshold voltage of the MOS transistor to vary with its source voltage. As a result, the signal from the sensor element is attenuated. Because of the attenuation, additional amplifiers are required to compensate for the attenuation. Unfortunately, use of such additional amplifiers causes the signal-to-noise ratio of the sensor output to be degraded. Also, there may be variations in the gain from pixel to pixel because of variations in the body effect and other transistor characteristics which contribute to the determination of the gain. Such variations manifest themselves as fixed pattern noise (FPN). Although each transistor could be placed within its own substrate diffusion well to eliminate body effect, doing so significantly reduces the density of sensor array that is achievable.

These problems with source followers employed in active arrays may be alleviated, in accordance with the principles of the invention, by employing for each element a differential amplifier. However, instead of including an entire differential amplifier within each element, part of the differential amplifier structure is shared among each sensor element connected to a particular column. For example, in one embodiment of the invention, the differential amplifier may be a differential pair operational transconductance amplifier (OTA) which is connected in a feedback configuration. However, instead of including an OTA within each sensor element of the array, part of the OTA structure is shared among each sensor element connected to a particular column. Thus, each sensor element may include the same components as in the prior art when a source follower was employed, with the remaining elements necessary to complete the OTA being shared among all the sensor elements of the column. Although gains greater than one are achievable by employing the differential amplifier with a feedback network, to avoid introducing fixed pattern noise, substantially unity gain, i.e., a gain of approximately one, but typically slightly less than one, is often preferred.

We have also recognized, in accordance with an aspect of the invention, that the shared differential amplifier model of array reading may be employed for any active array readout application, e.g., including arrays that are not in themselves per se sensor arrays, where the necessary structure to form the shared differential amplifier is included within the elements of the array.

Detailed description

Figure 1:
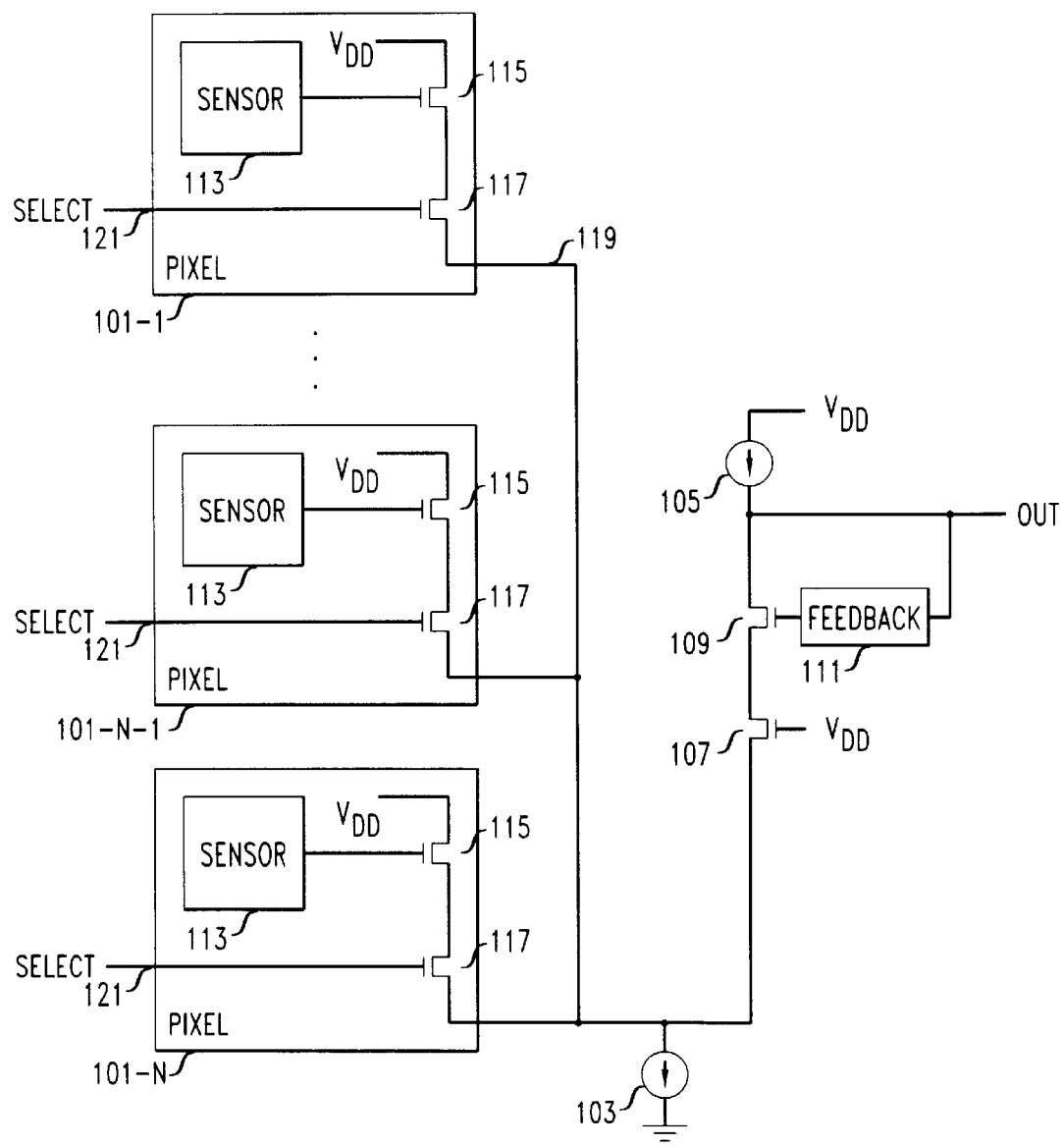
FIG. 1 shows an exemplary arrangement for reading analog values from a single column of a sensor array in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

FIG. 1 shows an exemplary arrangement for reading analog values from a single column of a sensor array in accordance with the principles of the invention. Shown in FIG. 1 are a) active sensors array elements 101, including elements 101-1 through 101-N; b) current sources 103 and 105; c) transistors 107 and 109; and e) optional feedback network 111.

Active sensor array elements 101 are arranged into columns. Note that although "columns" are referred to herein, the principles of the invention apply equally to "rows" of sensor array elements.

Each of active sensor array elements 101 includes sensor 113 and transistors 115 and 117. Sensor 113 detects some property and supplies an analog value representing the property detected to transistor 115. For example, sensor 113 may be a pixel of an image sensor and the property detected is light which is incident upon sensor 113 during a certain period of time. Transistor 115 is arranged as a driving transistor, for coupling the output of sensor 113 to column line 119 via switch transistor 117, when switch transistor 117 is addressed, i.e., selected or enabled, e.g., by causing input 121 to be a logic 1. Current source 103 is coupled to column line 119 to supply bias current for transistors 115 and 117 to enable them to operate. The arrangements of sensor elements such as active sensor array elements 101 into columns for readout is known in the prior art.

Transistors 107 and 109, along with current sources 103 and 105 and feedback network 111, are arranged so as to complete a differential pair operational transconductance amplifier (OTA) with transistors 115 and 117 of sensor 113 for a currently selected one of active sensor array elements 101. In such an arrangement transistor 107 is arranged as a constantly on switching transistor and transistor 109 is arranged in a feedback configuration, feeding back the overall output of the column to its input. Note that differential pair operational transconductance amplifiers are well known in the art to note that transistor 107 is employed to replicate transistor 117 from matching purposes. However if offset is not a problem transistor 107 may be deleted.

In accordance with an aspect of the invention, as each of active sensor array elements 101 are selected in turn, a new OTA is formed from transistors 107 and 109, current sources 103 and 105, feedback network 111, and transistors 115 and 117 of the selected one of active sensor array elements 101. Advantageously, transistors 107 and 109, current sources 103 and 105, and feedback network 111 are shared among all of the active sensor array elements 101 of the row. Doing so reduces the cost of the sensor array, while not degrading its density.

The gain of the OTA formed is a function of feedback network 111. For example, feedback network 111 may simply be a short circuit from its input to its output. If so, the OTA that is formed has a gain that is substantially equal to one. If another type of network is employed, e.g., a resistor divider network, so that the feedback network 111 has a gain of less than 1, then the overall gain of the OTA that is formed will be greater than 1. The feedback network may be an active network, e.g., it may include buffers or other active components.

The gain of the arrangement of FIG. 1 does not suffer from dependence on the MOS body effect as do prior art arrangements because transistor 109 has the same gate-source voltage as does transistor 115, resulting in opposite contributions by the body effect and so effectively canceling it out. An alternative way to conceptualize this is that the differential amplifier has a high open loop gain, and therefore the feedback causes the variation in open loop gain due to body effect to be canceled out in the closed loop gain.

Resistors may be substituted for either or both of current sources 103 and 105 without substantially altering operation of the amplifier.

Another type of differential amplifier that may be formed is a differential voltage amplifier.

Note that the sensor array may include additional columns, and each additional column may be identical in structure to the arrangement shown in FIG. 1.

We have also recognized, in accordance with an aspect of the invention, that the shared differential amplifier model may be employed for any active array readout application, e.g., including arrays that are not in themselves per se sensor arrays, where the necessary structure to form the shared differential amplifier is included within the elements of the array. For example, the array may be formed from signal sources coupled to an array of capacitors for use in sample-and-hold applications on which are deposited values that are to be further processed, e.g., amplified or converted from analog-to-digital representation. Such signal sources and capacitors would be substituted for sensors 113.

What is claimed is:

1. An apparatus, comprising:
   an addressable array of elements presenting analog values, each element of said addressable array including at least one active component, an output of each of said array elements being coupled to a common line; and
   circuitry connected to said common line which, when coupled to an addressed one of said addressable array elements, forms a differential amplifier with said at least one active component of said addressed one of said addressable array elements, wherein said at least one active component of each element includes a first transistor and said circuitry includes a second transistor, and wherein said differential amplifier is arranged to provide equal gate-source voltages to said first and second transistors to cancel out opposite contributions of body effects of said first and second transistors.

2. The apparatus as defined in claim 1, wherein said differential amplifier is a differential pair operational transconductance amplifier.

3. The apparatus as defined in claim 1, wherein said array of elements presenting analog values is a sensor array.

4. The apparatus as defined in claim 1, wherein said array of elements presenting analog values is not per se a sensor array.

5. The apparatus as defined in claim 1, wherein said differential amplifier is arranged to yield substantially unity gain.

6. The apparatus as defined in claim 1, wherein said at least one active component includes said first transistor in series with a first switch transistor, said first transistor being a driving transistor, and wherein said circuitry includes said second transistor in series with a second switch transistor, and said first switch transistor and said second switch are matching.

7. The apparatus as defined in claim 1, wherein said circuitry connected to said common line includes at least one current source.

8. The apparatus as defined in claim 1, wherein said circuitry connected to said common line further includes:
first and second current sources, said second current source being coupled directly to said common line; and
said first current source being coupled to said second transistor, said second transistor being configured as a driving transistor and being coupled to said second current source.

9. The apparatus as defined in claim 8, wherein said circuitry further includes a third transistor, wherein said third transistor is arranged as a constantly on switch and couples said second transistor to said second current source.

10. The apparatus as defined in claim 8, wherein said driving transistor is coupled by a feedback network from an output of said apparatus to an input of said second transistor, whereby a non-unity gain is achieved.

11. The apparatus as defined in claim 8, further including a third transistor, wherein said third transistor is arranged as a constantly on switch and couples said second transistor to said second current source and wherein said driving transistor is coupled by a feedback network from an output of said apparatus to an input of said driving transistor, whereby a non-unity gain is achieved for said output of each of said array elements.

12. A method for use with an addressable array of elements presenting analog values, each element of said addressable array including at least one active component, an output of each of said array elements being coupled to a common line, the method comprising the steps of:
selecting a first element of said addressable array of elements so as to form a first differential amplifier using said at least one active component and active circuitry external to all of said addressable array elements; and
canceling out opposite contributions of a first body effect of said at least one active component of said first element and a second body effect of said active circuitry by said first differential amplifier.

13. The method as defined in claim 12, wherein said first differential amplifier has substantially unity gain.

14. The method as defined in claim 12, wherein said first differential amplifier is a differential pair operational transconductance amplifier.

15. The method as defined in claim 12, further including the steps of:
selecting a second element of said addressable array of elements so as to form a second differential amplifier using said at least one active component and said active circuitry external to all of said addressable array elements; and
canceling out opposite contributions of a third body effect of said at least one active component of said second element and said second body effect of said active circuitry by said second differential amplifier.

16. The method as defined in claim 15, wherein said first differential amplifier and said second differential amplifier have substantially uniform gain.

17. The method as defined in claim 15, wherein said second differential amplifier has a unity gain.

18. The method as defined in claim 15, wherein said first differential amplifier and said second differential amplifier have different gains.

19. The method as defined in claim 15, wherein said second differential amplifier is a differential pair operational transconductance amplifier.

20. The method as defined in claim 15, wherein said first differential amplifier and said second differential amplifier have different configurations due to differences in said active components of said first selected element and said second selected element;
wherein said canceling step by said first differential amplifier includes the step of:
feeding back an output of said first differential amplifier to cancel out variation in an open loop gain of said first differential amplifier due to said first and second body effects via a closed loop gain; and
wherein said canceling step by said second differential amplifier includes the step of:
feeding back an output of said second differential amplifier to cancel out variation in an open loop gain of said second differential amplifier due to said second and third body effects via a closed loop gain.

21. The method as defined in claim 15, wherein said first differential amplifier and said second differential amplifier have different gains due to said active components of said first selected element and said second selected element being of differing configurations.

22. A method comprising the steps of:
time multiplexing a portion of an amplifier circuit for use by active array elements to form a complete differential amplifier when any of said active array elements are selected by using active components within said selected one of said active array elements; and
canceling out opposite contributions of a body effect of an active component of any one of said active array elements and a body effect of an active component of said portion.

23. The method as defined in claim 22, wherein said formed complete differential amplifier is a differential pair operational transconductance amplifier.

24. The method as defined in claim 22, wherein said active array elements are selectively coupled to a common line.

25. An array readout apparatus, comprising:
an array of means for presenting analog values, each of said presenting means including at least one active component, an output of each of presenting means being coupled to a common line; and
means connected to said common line which, when coupled to an addressed one of said presenting means, forming a differential amplifier with said at least one active component of said addressed one of said presenting means wherein said differential amplifier includes means for canceling out opposite contributions of a first body effect of said at least one active component of each one of said presenting means and a second body effect of said forming means.

26. The apparatus as defined in claim 25, wherein said means for presenting analog values is an array of means for sensing.

27. The apparatus as defined in claim 25, wherein said differential amplifier is a differential pair operational transconductance amplifier.

28. The apparatus as defined in claim 25, wherein said differential amplifier has a unity gain.

* * * * *